Nov. 4, 1947.  J. G. LOY  2,430,067
OUTLET BOX SECURING MEANS
Filed May 12, 1944
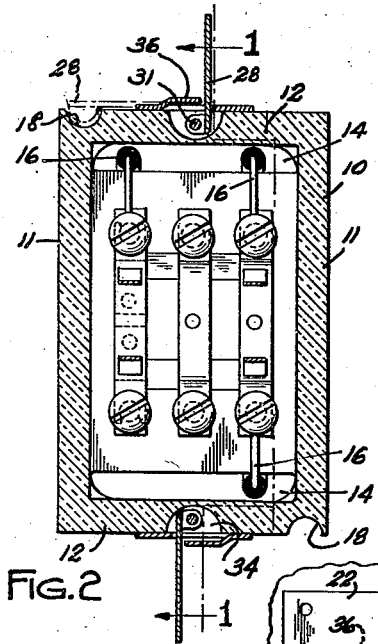
Fig. 2
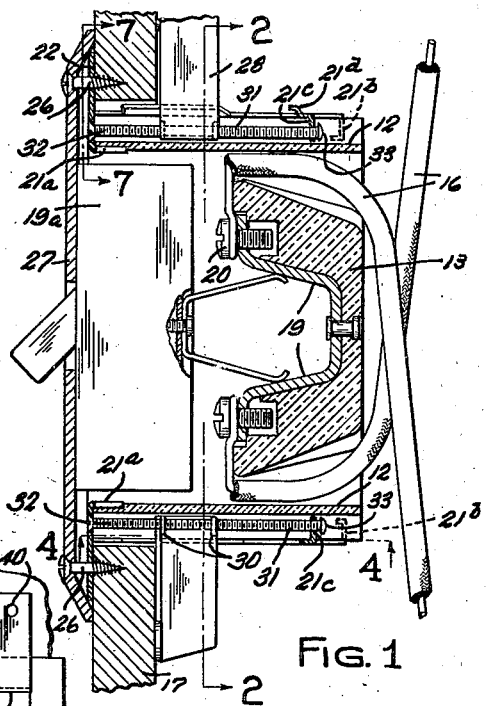
Fig. 7
Fig. 1
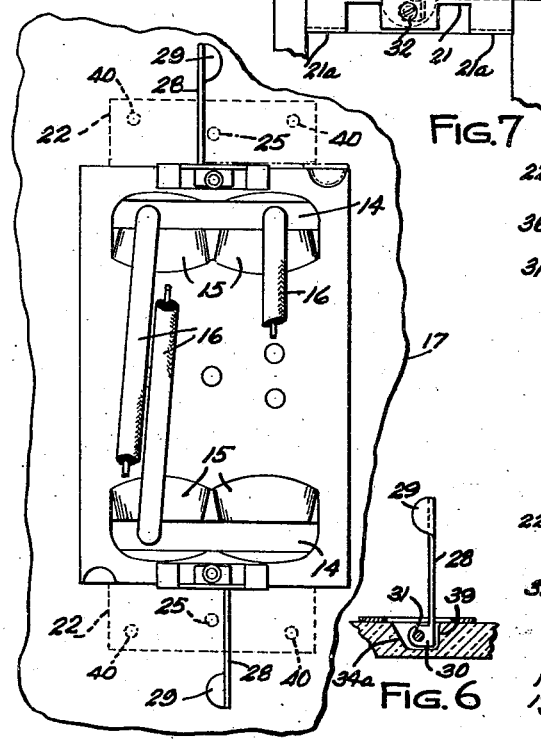
Fig. 3
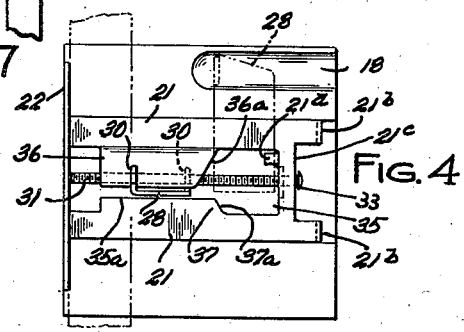
Fig. 4
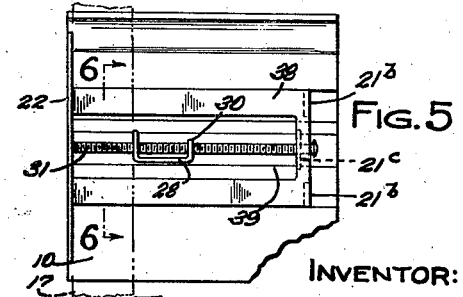
Fig. 5
Fig. 6
INVENTOR:
John G. Loy
BY Hyde and Meyer
ATTORNEYS.

Patented Nov. 4, 1947

2,430,067

UNITED STATES PATENT OFFICE 2,430,067

OUTLET BOX SECURING MEANS

John G. Loy, Findlay, Ohio, assignor to Porcelain Products, Inc., Findlay, Ohio, a corporation of Delaware Application May 12, 1944, Serial No. 535,376

3 Claims. (Cl. 220—3.6)

1

This invention relates to securing means for devices such as wiring blocks and outlet boxes, such as are used for electric wiring, and more particularly to securing means for concealed wiring outlets or terminal blocks.

One object of the invention is to provide an improved securing means which very materially simplifies the method or technique of installation of concealed wiring, not only reducing the labor and cost of installation, but also avoiding many of the objections to or difficulties encountered with prior devices.

A further object is to provide an improved device which readily and conveniently may be inserted and securely fastened in a wall panel after securement of the panel to the studding, and which at the same time provides means for conveniently providing proper connection of the concealed wires to the terminals within the box.

Another object is to provide an improved wiring block or outlet box adapted for insertion into position through an opening in a wall panel after securement of the panel to the wood framing and which includes means operatable from the exposed face of the panel for causing interlock or engagement of the box securing means with the rear face of the panel, to enable the box to be clamped or secured to the panel by parts engaging its concealed and exposed faces.

Still another object is to provide securing means for an improved wiring block or outlet box for concealed wiring which permits its attachment after the wall panels are secured to the framing and which therefore prevents any possibility of the box being injured, wrenched or loosened by lathers or plasterers and which avoids rough jagged openings requiring repair, such as are frequently made, in fitting lath or wall panels to the framing, to expose the box for access by the electrician.

Further objects of the invention in part are obvious and in part will appear more in detail hereinafter.

In the drawings,

Fig. 1 is a sectional view through my improved wiring block with the cover means in place, this view being taken along line 1—1 of Fig. 2;

Fig. 2 is a sectional view of the same taken along the line 2—2 of Fig. 1;

Fig. 3 is a bottom plan view of the device of Fig. 1;

Fig. 4 is an end view taken along the line 4—4 of Fig. 1 of the device of Figs. 1 to 3 showing one manner of securing my device to a wall;

2

Figs. 5 and 6 show a modified form of securing device; while

Fig. 7 is a fragmental view taken along the line 7—7 of Fig. 1.

My improved securing means may be applied to metal outlet boxes of standard form, as will later appear. However, for convenience, and in no sense of limitation, the drawings illustrate a box made of nonconducting material, except, of course, for bus bars, terminal screws, or securing or other operating parts. The box may be of any size or shape and built, for example, to receive or accommodate two, three or more units, such as switches, side by side, as is customary. As illustrated, the box is of single unit form. It comprises a rectangular body 10, made of porcelain or other ceramic material, a suitable plastic material, hard rubber, or any rubber substitute, or any hard non-conducting material suitable for the purpose. It includes side walls 11, end walls 12, and a bottom 13. The front or top is open, to be finally closed by a cover plate.

The bottom wall 13 is in the form of a bridge integrally connecting the side walls 11 and free of direct attachment to the end walls 12, thus leaving at each end of the box a deep slot or opening 14 between its end wall and said bridge. Preferably, the bridge wall is recessed or cut back, at an angle, to form two rounded shallow channels 15 in each opening which form seats to receive the lead wires or looms indicated at 16. This arrangement dispenses with knockouts, since the openings are deep and as the wires are led in from the back and the terminals are housed within the bridge a fairly long tortuous passage intervenes between the terminals, where arcs might arise, and the outside of the box, safeguarding surrounding parts from fire or short circuit effects. Bus bars 19 riveted or otherwise permanently anchored to the bridge and each provided with one or more binding posts 20 coact with the cooperating spring contacts of an electric device 19a carried by the cover 27 all as described in my Patent No. 2,401,948, granted June 11, 1946.

This box is specially designed for use with the more modern wall panel, consisting of wooden framing or studding to which any prefabricated panel material, such as plaster board, rock lath, sheet rock, or the like, is secured, although it too may be inserted into an opening and secured to older forms of wall panel, including lath and plaster, expanded metal, or the like.

In erecting the building, after the wooden framing is finished, the electrician installs the wiring in the regular way, except that he omits all outlet boxes, and, instead, leaves free wire ends folded inside the wall or sticking out from the wall at each required outlet location. Thus, the outlet boxes are not put in place until the carpenters, lathers and plasterers have left the job, and there is no liability of injury to boxes previously installed. Then the electrican cuts a neat, rectangular opening at each outlet point and installs a device using my improved securing means. Therefore, each box opening may be neat, requiring no repairs to damaged paneling. The box therefore is so made that it can be secured in place and the wiring completed after the panel has been finished. The securing means now to be described, of course, may be embodied in metal outlet boxes of more or less standard form equipped with knock-outs, and the wiring connections completed thereto in the usual manner, but the drawings show it applied to a box made of insulating material, solely for purposes of illustration.

As illustrated, each box is provided, on each end, with a metal plate member 21, secured to the box in any suitable manner, as by tongues 21a, 21b, bent around suitable wall or undercut portions of the box body provided for the purpose. This plate has a front flange 22 lying in the same plane as the front of the box, and providing a shoulder to engage the outer wall panel surface. It is provided with threaded openings 25 to receive screws 26 by means of which the cover plate 27 is attached.

Plate 21 also supports an adjustable abutment member or arm 28, adapted to be engaged with the inner surface of the panel to form a second jaw which cooperates with the flange 22, also functioning as a jaw, for clamping the box to the panel. The member 28 therefore is so arranged and mounted upon the plate and box that when retracted it does not interfere with insertion through a hole in a wall panel of the box into its final position, and after the box is in place, said member 28 may be so manipulated from the exposed front face of the box and panel as to throw it out and to advance it toward flange 22 and into locking position behind the panel and then to apply it thereto with clamping pressure. Any suitable arrangement for the purpose may be employed.

In Fig. 1 the abutment member is in the form of a sheet metal arm 28 with the plane of the sheet normal to the box bottom, said arm having a laterally extending portion or ear 29, adapted to provide extra bearing surface on the panel, and parallel ears 30, one or both provided with threaded openings to receive and coact with a long screw 31 passing through plate 21 and provided with a slotted head 32 exposed at the front face. The far end of the screw passes through a guiding opening in a small ear 21c of plate 21 and has an upset head 33 to retain the screw in place. As shown clearly in Fig. 2, screw 31 lies in a recess 34 of the end wall 12 and is on the box side of plate 21, while arm 28 is offset by ears 30 to lie on the outside of plate 21, the ears 30 extending through a central opening 35 in the plate 21. As best seen in Fig. 4, the central opening 35 is wider near the bottom of the box for a distance equal to the width of arm 28 so that when the device 10 is inserted through a rectangular opening in the wall panel 17 the arm 28 may lie substantially flat against the outer face of the end wall 12 as shown in dot-dash lines in Figs. 2 and 4. A groove 18 is recessed into each end wall 12 to receive the ear 29 in this position of the arm 28. A tongue 21d may be provided on plate 21 to overlie arm 28 in the dot-dash position of Fig. 4 to insure that the arm lies flat until screw 31 is turned.

In the form of device shown in Figs. 1 to 4 and 7, positive means is provided for insuring that the arm 28 moves to a position in which it extends beyond the boundary of the wall opening. As shown in Fig. 4, the opening 35 is narrowed as at 35a to provide a slot adapted to slidably receive the arm 28 and to hold the same positively in a position substantially at right angles to the end wall 12 as shown in Figs. 1, 2, and 7. A tongue 36 of plate 21 is bent slightly outwardly from the end of the box as shown in Figs. 1, 2 and 7. The end edge 36a of this tongue nearer the bottom of the box is inclined toward the top of the box so that as screw 31 is turned (by means of a screw driver engaging its slotted head 32) arm 28 is moved toward flange 22 and will ride up the inclined edge 36a until it enters the slot 35a. The other side of this slot is formed by a tongue 37 which lies in the plane of plate 21 for limiting the movement of arm 28 downwardly as viewed in Fig. 4 or toward the right as viewed in Fig. 2. Preferably the end edge 37a of this tongue 37 nearer the bottom of the box is inclined toward the top of the box so that if arm 28 accidentally goes too far toward that side of the opening 35 it will, nevertheless, be cammed to the position shown in Fig. 4 in full lines.

The operation of the device described above should now be apparent. When the device 10 is inserted through an opening in wall panel 17, which is only slightly larger than the outline of the device 10 itself, each arm 28 lies flat against the outside face of its associated end wall 12 as shown in dot-dash lines in Figs. 2 and 4. In this position the arm 28 does not extend beyond the edges of the wall panel opening and does not interfere with the insertion of the device 10 freely through the opening in the wall. The flange or shoulder 22 will then engage the outer face of the wall panel. The arm 28 now lies on the side of panel 17 opposite the flange 22. Screw 31 is now manipulated by means of its slotted head 32 so that its threaded engagement with ears 30 drives arm 28 toward flange 22. The arm will ride up the inclined edges 36a or 37a until it lies in slot 35a at right angles to end wall 12 as shown in Figs. 1, 3, and 7 and in full lines in Figs. 2 and 4. Sufficient rotation of screw 31 will cause arm 28 to engage the rear face of wall panel 17 so that in operative position the wall panel is firmly clamped between flange 22 and arm 28. The device 10 is thus fixed firmly in position after which the escutcheon plate 27 carrying the device 19a is secured in position by means of screws 26 at which time bus bars 19 are in engagement with the spring contacts connected with the device 19a.

A modified form of securing means is shown in Figs. 5 and 6. Hence the plate 38 is similar in most respects to the plate 21 of my first described form. It is secured to the device 10 by clamping tongues like those previously described or by welding if the device 10 is of metal. The plate 38 carries an abutment or flange 22 like that previously described. The screw 31 is rotatably mounted in flange 22 and tongue 21c as in the previous form of my device. The screw has a slotted head 32 like that previously described. Arm 28 is provided with ears 30 which have threaded engagement with screw 31 so that rotation of screw 31 causes arm 28 to travel towards flange 22 so as to provide the clamping action on the wall panel as previously described. A groove in the device 10, similar to the groove 18 before referred to, permits the arm 28 to lie flat against the outer face of end wall 12 when the device is inserted through the wall opening prior to manipulating the securing means as described in connection with the first form of my device. Here, however, no positive means is provided for causing arm 28 to assume the full line position at right angles to wall 12 as shown in Figs. 5 and 6. Instead, a frictional drag is relied on between ears 30 and screw 31.

By locating the two ears 30 slightly out of step with each other relative to screw 31, or by making the screw slightly oversize or the openings in ears 30 undersize, a binding action between the threads of screw 31 and of ears 30 is provided whereby a fairly strong frictional drag may be interposed between screw 31 and the arm 28 threaded upon it. Therefore, unless its motion is otherwise prevented, arm 28 turns with the screw in either direction until stopped. It will be noted from Fig. 6 that the recess 34a in end wall 12 which accommodates the screw 31 is of slightly different form from the recess 34 previously described. As shown in Fig. 6, the recess has a wall 39 extending substantially at right angles to the general plane of wall 21 to form an abutment limiting the movement of arm 28 in the clockwise direction from its position flat against the end wall 12 to the full line position thereshown.

The operation of the securing means shown in Figs. 5 and 6 should now be apparent. With the arm 28 flat against the outer face of wall 12, the device 10 is inserted through a suitable opening in the wall panel 17; flange 22 then engages the outer face of the wall panel. Screw 31 is then turned in the direction shown by the arrow of Fig. 6. The frictional drag between screw 31 and the ears 30 will then rotate arm 28 in the direction of the arrow of Fig. 6 until the arm abuts the shoulder 39 of recess 34a. The arm 28 may then be moved toward flange 22 sufficiently to provide a tight clamping effect on the wall panel 17 so as to hold the device 10 firmly in place. The device may be released from the wall panel 17 by rotating screw 31 in a counter clock-wise direction as viewed in Fig. 6. This will first drive the arm 28 away from flange 22 to release its clamping effect on panel 17 after which the frictional drag will cause screw 31 to turn arm 28 flat against the end wall 12 so that the device 10 may be moved easily out of the recess in the wall panel.

While I have shown my device in some of the views as attached by clamping tongues to a device 10 made of insulating material, I do not intend to limit myself to such use. The plate 21 may be incorporated in or welded to the wall of a metallic box as will be obvious. My device is useful as a securing means for an object inserted through an opening in a panel where the object is to be secured in place by clamping action with reference to the panel.

If desired, holes 40 may be provided in flanges 22 so that the wiring block or outlet box may be attached to wall 17 by usual screws or nails at these points where such attachment is desirable.

What I claim is:

1. An outlet box having a body adapted for insertion into a wall panel opening and provided with a flange adapted to bear against the outer face of said panel, a screw carried by said body and rotatable from the outer face of said panel when said body is inserted in said opening, abutment means having threaded engagement with said screw and spaced from said flange, said abutment means being adapted to lie in a position close to said body so as to pass through said opening or to turn upon the axis of said screw to a position in which it extends outwardly from said body, and cam means mounted on the body and engageable by said abutment means for causing movement thereof to its outwardly extending position by movement of said abutment means axially of said screw toward said shoulder.

2. An outlet box having a body portion insertable into a wall panel opening and provided with side walls, a bottom, and a front shoulder for engaging the exposed face of said wall panel, an abutment member mounted upon one of the side walls of said body for movement inwardly and outwardly relative to such side wall and also for movement bodily along said side wall toward and away from said shoulder, means for operating said member to move it bodily relatively to said shoulder, and cam means mounted upon the body and engaged by said member and of such form that bodily movement of said member toward said shoulder also causes it to move outwardly relatively to such side wall.

3. An outlet box having a body adapted for insertion into a wall panel opening and provided with a flange adapted to bear against the outer face of said panel, a screw mounted externally upon said body and rotatable from the outer face of said panel when said body is inserted in said opening, abutment means having threaded engagement with said screw and spaced from said flange, said abutment means being rotatable about the screw axis and being adapted when remote from said flange to either extend outwardly from the body or to lie in a position close to the body so as to pass through said opening, and holding means located on the body at a point remote from said flange and there engageable by said abutment means and effective to releasably confine it against movement to its position extending outwardly from the body.

JOHN G. LOY.

REFERENCES CITED

The following references are of record in the file of this patent:

UNITED STATES PATENTS

| Number | Name | Date |
| --- | --- | --- |
| 2,320,400 | Bedell | June 1, 1943 |
| 2,272,846 | Lindstrom | Feb. 10, 1942 |
| 2,357,787 | Windsheimer | Sept. 5, 1944 |
| 1,775,665 | Behm | Sept. 16, 1930 |
| 2,031,861 | Simek | Feb. 25, 1936 |
| 2,044,650 | Thompson | June 16, 1936 |
| 1,957,003 | Selen | May 1, 1934 |